US008166795B2

(12) United States Patent
Gehlhoff et al.

(10) Patent No.: US 8,166,795 B2

(45) Date of Patent: May 1, 2012

(54) OUT-OF-RANGE SENSOR RECALIBRATION

(75) Inventors: Wade L. Gehlhoff, Shakopee, MN (US); Chris W. Schottler, Chanhassen, MN (US); Kishore Balasubramanian, Bloomington, MN (US); Christian Fagerlund, Bredared (SE)

(73) Assignee: Eaton Corporation, Cleveland, OH (US)

( * ) Notice: Subject to any disclaimer, the term of this patent is extended or adjusted under 35 U.S.C. 154(b) by 347 days.

(21) Appl. No.: 12/626,970

(22) Filed: Nov. 30, 2009

(65) Prior Publication Data

US 2011/0126608 A1 Jun. 2, 2011

(51) Int. Cl.
*G01L 27/00* (2006.01)

(52) U.S. Cl. ............. 73/1.72; 73/1.01; 73/1.57; 73/1.71

(58) Field of Classification Search ................... 73/1.01, 73/1.02, 1.57, 1.59, 1.69, 1.71, 1.72
See application file for complete search history.

(56) References Cited

U.S. PATENT DOCUMENTS

| | | | | |
|---|---|---|---|---|
| 4,825,685 | A * | 5/1989 | Breimesser | 73/727 |
| 5,469,735 | A * | 11/1995 | Watanabe | 73/114.16 |
| 6,038,912 | A * | 3/2000 | Isobe et al. | 73/1.59 |
| 6,615,114 | B1 | 9/2003 | Skiba | |
| 6,705,296 | B2 * | 3/2004 | Horstmann et al. | 123/494 |
| 6,832,620 | B2 * | 12/2004 | Jaeger | 137/237 |
| 6,862,516 | B2 * | 3/2005 | Fujimoto | 701/107 |
| 7,134,413 | B2 * | 11/2006 | Cho | 123/179.17 |
| 7,356,399 | B2 * | 4/2008 | Eguchi et al. | 701/61 |
| 7,707,868 | B2 * | 5/2010 | Thiel et al. | 73/1.59 |
| 2006/0042964 | A1 * | 3/2006 | Mansouri et al. | 205/775 |
| 2006/0142931 | A1 * | 6/2006 | Cho | 701/114 |
| 2007/0277584 | A1 * | 12/2007 | Fischer et al. | 73/1.01 |
| 2008/0066522 | A1 * | 3/2008 | Thiel et al. | 73/1.57 |

FOREIGN PATENT DOCUMENTS

| | | | |
|---|---|---|---|
| EP | 1258717 | A2 | 11/2002 |
| WO | 2008027169 | A1 | 3/2008 |

* cited by examiner

*Primary Examiner* — David Rogers
(74) *Attorney, Agent, or Firm* — Quinn Law Group, PLLC

(57) ABSTRACT

A method for resetting a calibration of a sensor operating out-of-range in a hydraulic actuation system is provided. The hydraulic actuation system includes a pump, a reservoir, a plurality of work-ports, a plurality of sensors, and a valve system, and a controller for regulating the hydraulic actuation system based on fluid flow demand and sensed pressures. The method includes detecting the sensor operating out-of-range, opening all work-ports to the reservoir, resetting all sensors to reservoir pressure, supplying all sensors with fluid at maximum pump pressure, and sensing the maximum pump pressure at each sensor. Additionally, the method includes determining an average pressure value across all sensors, assigning the determined average pressure value to the sensor that is operating out-of-range, and resetting the calibration of the sensor that is operating out-of-range based on the reservoir pressure and the average pressure values.

20 Claims, 2 Drawing Sheets

OUT-OF-RANGE SENSOR RECALIBRATION

TECHNICAL FIELD

The present invention relates to sensor calibration, and, more particularly, to a preset, or automatic recalibration of an out-of-range sensor for a hydraulic actuation system.

BACKGROUND OF THE INVENTION

Hydraulic actuation systems, as employed to operate load transferring equipment, such as construction machinery, typically include a pressure source such as a pump, a fluid tank and at least one fluid cylinder to control a lifting arm of the subject machine.

It is known in the art to utilize various sensors, such as for sensing pressure of a working fluid or position of a valve, to control the operation of such hydraulic actuation systems. It is conceivable that such a pressure sensor may lose calibration or fall out of detection range, and fail to generate signals that properly correspond to the sensed parameters. Such a fault may lead to loss of critical data, and render the system inoperative.

SUMMARY OF THE INVENTION

A method is provided for resetting a calibration of a sensor operating out of a prescribed range in a hydraulic actuation system. The hydraulic actuation system includes a pump arranged to supply fluid flow in response to a fluid flow demand, a reservoir arranged to hold fluid, and a plurality of work-ports. The pump is in fluid communication with the reservoir and with the plurality of work-ports.

The hydraulic actuation system also includes a plurality of sensors, each sensor arranged to sense pressure at each corresponding work-port. The hydraulic actuation system additionally includes a valve system arranged to control fluid between the pump, the reservoir and the plurality of work-ports. The hydraulic actuation system also includes a controller arranged to regulate the pump and the valve system in response to the fluid flow demand and to the sensed pressures.

The method includes detecting the sensor operating out of the prescribed range, relieving pressure in the hydraulic actuation system, opening all work-ports to the reservoir, sensing pressure at each sensor, and resetting all sensors to reservoir pressure. The method additionally includes supplying all sensors with fluid at maximum pump pressure, sensing the maximum pump pressure at each sensor, and determining an average pressure value across all sensors whose sensed pressure is within the prescribed range of the maximum pump pressure.

Furthermore, the method includes assigning the determined average pressure value to the sensor that is operating out of the prescribed range, if the sensor operating out of the prescribed range is within the permitted error band relative to the maximum pump pressure. Moreover, the method includes resetting the calibration of the sensor that is operating out of the prescribed range based on the reservoir pressure and the average pressure values.

The method may also include identifying whether the sensor operating out of the prescribed range is within a permitted error band relative to the maximum pump pressure. In such a case, assigning the determined average pressure value to the sensor that is operating out of the prescribed range is accomplished if the sensor operating out of the prescribed range is within the permitted error band relative to the maximum pump pressure. If, on the other hand, the sensor operating out of the prescribed range is not within the permitted error band relative to the maximum pump pressure, the method may further include generating a malfunction signal.

According to the method, relieving pressure in the hydraulic actuation system may be performed for a predetermined amount of time, and may be accomplished either automatically, or manually by an operator of the hydraulic actuation system. The opening of all work-ports to the reservoir may be performed one at a time, in no particular order. The supplying of all sensors with fluid at maximum pump pressure may similarly be performed one at a time.

The above method may be applied to a machine operated via a hydraulic actuation system. The hydraulic actuation system of the machine employs a plurality of work-ports that are arranged to provide energy-transfer in response to the fluid flow controlled according to the above description.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
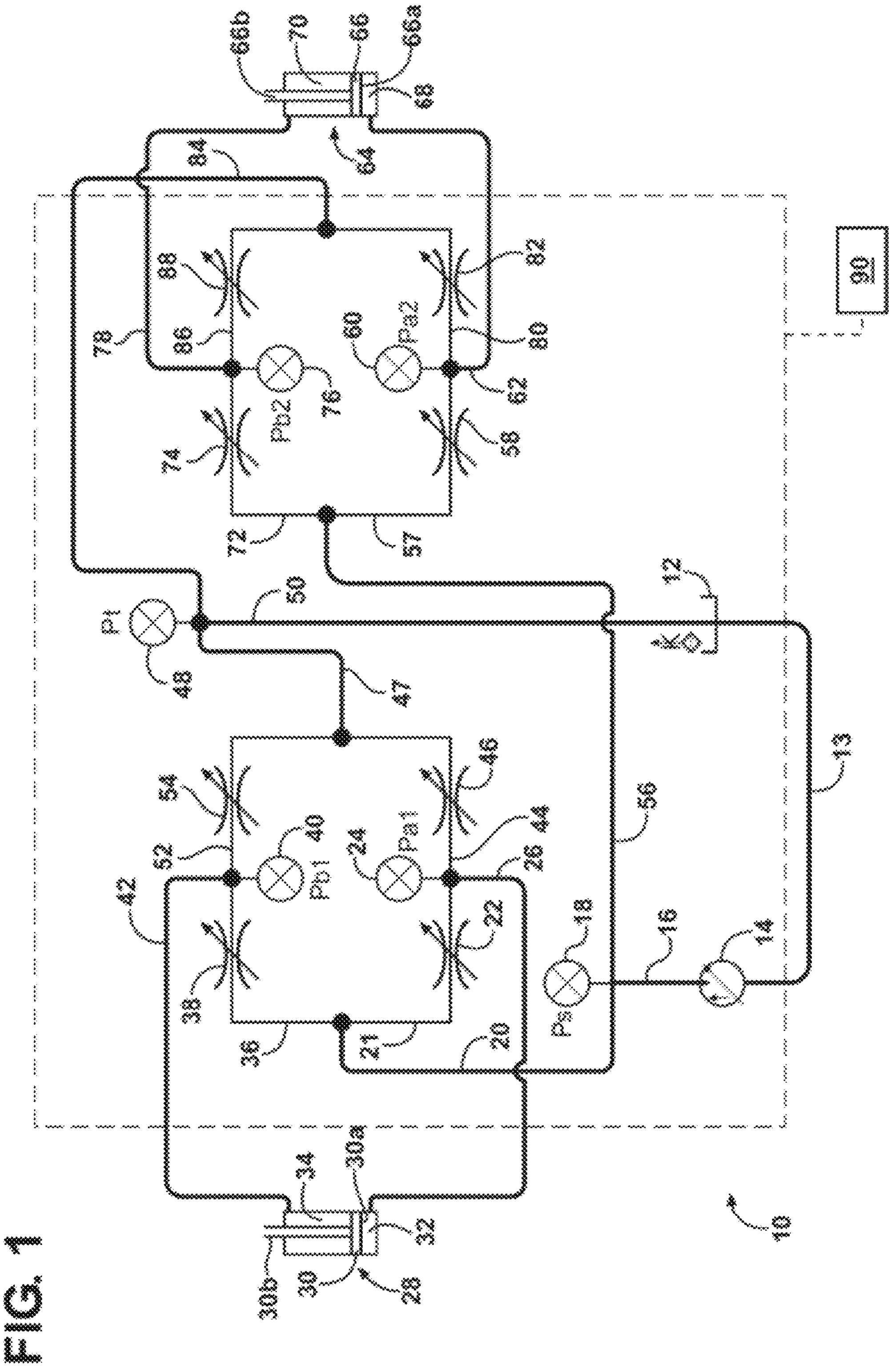
FIG. 1 is a schematic diagram illustrating a hydraulic actuation system employing pressure sensors for controlling system function.

Referring to the drawings wherein like reference numbers correspond to like or similar components throughout the several figures, FIG. 1 illustrates a schematic diagram illustrating a hydraulic actuation system 10, employing pressure sensors for controlling system function. Hydraulic actuation system 10 is commonly employed in earth moving or construction machines (not shown) for accomplishing a prescribed task, such as transferring a load.

Hydraulic actuation system 10 includes a fluid reservoir 12 in fluid communication with a pressure source, such as a pump 14 via a fluid passage 13. The pressure source 14 is in fluid communication with a first pressure sensor 18 via a fluid passage 16. Sensor 18 is arranged to sense pressure Ps of the fluid supplied by the pressure source 14. After sensor 18, the fluid is communicated via a passage 20. Passage 20 communicates fluid to a junction from which the fluid is communicated via a passage 21 to an orifice 22. The orifice 22 is in fluid communication with a second pressure sensor 24. The pressure sensor 24 is arranged to sense pressure Pa1 of the fluid supplied to a hydraulic actuator 28 via a fluid passage 26.

The hydraulic actuator 28 includes a moveable piston 30 that includes a piston head 30*a* and a rod 30*b*. The piston 30 separates the hydraulic actuator into a first work-port or pressure chamber 32 on the side of the piston head 30*a*, and a second work-port or pressure chamber 34 on the side of the piston rod 30*b*. Specifically, the pressure Pa1 sensed by the pressure sensor 24 corresponds to pressure of the fluid inside the first pressure chamber 32.

At the junction with passage 21, passage 20 is also in fluid communication with a fluid passage 36, which supplies fluid to an orifice 38. The orifice 38 is in fluid communication with a third pressure sensor 40. The pressure sensor 40 is arranged to sense pressure Pb1 of the fluid supplied to the hydraulic actuator 28 via a fluid passage 42. Specifically, the pressure Pb1 sensed by the pressure sensor 40 corresponds to pressure of the fluid inside the second pressure chamber 34.

The sensor 24 is also in fluid communication with an orifice 46 via a fluid passage 44. The orifice 46 is in fluid communication with a fourth pressure sensor 48 via a fluid passage 47. Pressure sensor 48 is arranged to sense pressure Pt of the fluid returned to the reservoir 12 via a fluid passage 50. The orifice 22 and the orifice 46 may be separate control valves configured to regulate fluid flow between the pressure source 14, the reservoir 12 and the first pressure chamber 32, or be combined into a single control valve structure.

The sensor 40 is also in fluid communication with an orifice 54 via a fluid passage 52. The orifice 54 is in fluid communication with the pressure sensor 48. The orifice 38 and the orifice 54 may be separate control valves configured to regulate fluid flow between the pressure source 14, the reservoir 12 and the second pressure chamber 34, or be combined into a single control valve structure.

Following the sensor 18, the fluid is additionally communicated via a passage 56 to a junction from which the fluid is communicated via a passage 57 to an orifice 58. The orifice 58 is in fluid communication with a fifth pressure sensor 60. The pressure sensor 60 is arranged to sense pressure Pa2 of the fluid supplied to a hydraulic actuator 64 via a fluid passage 62.

The hydraulic actuator 64 includes a moveable piston 66 that includes a piston head 66*a* and a rod 66*b*. The piston 66 separates the hydraulic actuator into a first work-port or pressure chamber 68 on the side of the piston head 66*a*, and a second work-port or pressure chamber 70 on the side of the piston rod 66*b*. Specifically, the pressure Pa2 sensed by the pressure sensor 60 corresponds to pressure of the fluid inside the first pressure chamber 68.

At the junction with passage 57, passage 56 is also in fluid communication with a fluid passage 72, which supplies fluid to an orifice 74. The orifice 74 is in fluid communication with a sixth pressure sensor 76. The pressure sensor 76 is arranged to sense pressure Pb2 of the fluid supplied to the hydraulic actuator 64 via a fluid passage 78. Specifically, the pressure Pb2 sensed by the pressure sensor 76 corresponds to pressure of the fluid inside the second pressure chamber 70.

The sensor 60 is also in fluid communication with an orifice 82 via a fluid passage 80. The orifice 82 is in fluid communication with a fourth pressure sensor 48 via a fluid passage 84, from where the fluid is communicated to the reservoir 12 via passage 50. The orifice 58 and the orifice 82 may be separate control valves configured to regulate fluid flow between the pressure source 14, the reservoir 12 and the first pressure chamber 68, or be combined into a single control valve structure.

The sensor 76 is also in fluid communication with an orifice 88 via a fluid passage 86. The orifice 88 is in fluid communication with the pressure sensor 48. The orifice 74 and the orifice 88 may be separate control valves configured to regulate fluid flow between the pressure source 14, the reservoir 12 and the second pressure chamber 70, or be combined into a single control valve structure.

Together, the eight orifices 22, 38, 46, 54, 58, 74, 82, and 88 form a valve system for managing fluid flow through the hydraulic actuation system 10. A controller 90, such as an electronic control unit (ECU), is programmed to regulate the pressure source 14 and the orifices 22, 38, 46, 54, 58, 74, 82, and 88. As understood by those skilled in the art, controller 90 regulates the pressure source 14 and the orifices 22, 38, 46, 54, 58, 74, 82, and 88 based on differences between pressures Ps, Pa1, Pb1, Pa2, Pb2 and Pt calculated by the controller, as well as according to the fluid flow demand. The fluid flow demand is generally established by a request from a construction machine's operator, for example, to raise or lower a particular load.

The pressure data sensed and communicated to the controller 90 is additionally employed to determine which of the two chambers 32 and 34 of actuator 28, as well as which of the two chambers 68 and 70 of actuator 64, is subjected to a load. For example, in order to raise a load via the actuator 28, hydraulic actuation system 10 is regulated to supply fluid to chamber 32 such that the pressure generated within passage 16 exceeds the pressure seen by chamber 32. As known by those skilled in the art, the velocity with which a load is to be raised, which is set up by the flow rate through a particular orifice, is controlled by varying the restriction at the particular orifice and the difference in pressure between Pa1, Pb1, Ps, and Pt. It is to be additionally appreciated that when raising a specific load, chamber 32 is required to operate against the force of gravity to handle the load, i.e., the load is "passive", and thus operates an upstream work-port connecting to pressure source 14. In such a situation, chamber 34 operates as a downstream work-port connecting fluid flow to reservoir 12. On the other hand, when lowering a load, the force of gravity assists operation of the chamber 32, i.e., the load is "overrunning", and thus operates as a downstream work-port, while chamber 34 operates as an upstream work-port. Actuator 64 operates similarly to actuator 28, and is therefore also controlled according to the above description.

At least one of the pressure sensors, 18, 24, 40, 48, 60 and 76, may contain a temperature sensor (not shown) in order to detect temperature of the pressurized fluid and provide such data to the controller 90. Having such temperature data, enables the controller 90 to calculate viscosity of the fluid. As appreciated by those skilled in the art, with fluid viscosity, as well as the pressure drop across each particular orifice being known, fluid flow across each orifice may be regulated. The controller 90 regulates fluid flow by adjusting the opening of each respective orifice 22, 38, 46, 54, 58, 74, 82, and 88, and the pressure Ps provided by the pressure source 14. Operation of the hydraulic actuation system 10 is subject to the maximum fluid flow capacity or capability of the pressure source 14. Therefore, fluid flows to chambers 32 and 34, as well as to chambers 68 and 70, are reduced by an identical ratio, in order to ensure that the maximum capacity of the pressure source is not exceeded, and the machine operator's request to handle a particular load is satisfied.

Figure 2:
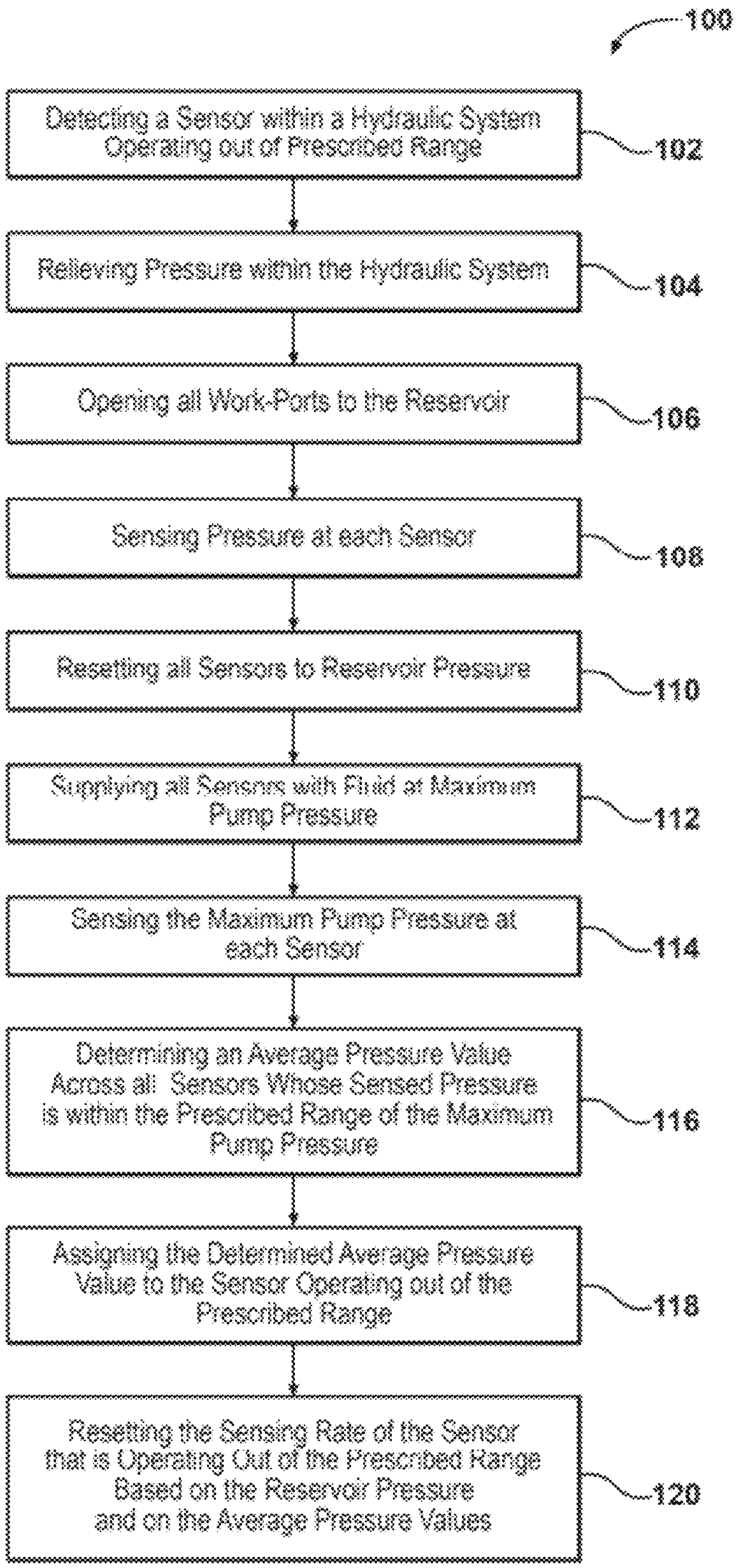
FIG. 2 is a flowchart of a method for controlling the hydraulic actuation system of FIG. 1 operating with an out-of-range pressure sensor.

Referring to FIG. 2 in conjunction with the structure disclosed in FIG. 1 and described above, a method 100 is provided for resetting calibration of a pressure sensor that is operating out of a prescribed range. According to the method 100, the resetting of the calibration takes place while the hydraulic actuation system 10 is fully operational, and is provided to facilitate a more precise response by the system 10 to fluid flow demand generated by the machine's operator.

Typically, a pressure sensor, such as one of the sensors, 18, 24, 40, 48, 60 and 76, falling out-of-range may result in erroneous pressure data being communicated to the controller 90, and consequently being used to control the hydraulic actuation system 10. Such an event may lead to a partial or even complete loss of control over the hydraulic actuation system 10, because with the loss of control via pressure regulation, control over the fluid flow is similarly lost. Method 100, on the other hand, allows recalibration of an out-of-range sensor without removing the machine from service, such that the desired operation of the machine is restored.

Method 100 shown in FIG. 2 commences with a frame 102 where a sensor operating out of the prescribed range is detected. Out-of-range operation of one of sensors 18, 24, 40, 48, 60 and 76 is typically detected by the controller 90 via registering a sensed pressure value that is outside a prescribed tolerance or margin with respect to the expected pressure reading. Typically, pressure sensors such as contemplated herein, operate based on a gain that has a linear progression, i.e., the sensor's output is directly proportional to the received input. Thus, to estimate gain for subsequent calibration of a sensor such as 18, 24, 40, 48, 60 and 76, only two values need to be established. In order to limit inaccuracy in the estimated gain, it is preferred that one of the established values be at the lower end of the sensing range, and the other value at the upper end.

Following frame 102, the method proceeds to frame 104, where pressure in the hydraulic actuation system 10 is relieved to the atmosphere. In order for the hydraulic actuation system 10 to enter the pressure relief mode, a.k.a., "float mode", the system may request the operator to confirm the desired operation. In frame 104, the pressure in the hydraulic actuation system 10 is preferably relieved for a predetermined amount of time to assure that the system has been substantially depressurized.

After relieving the pressure in the hydraulic actuation system 10, the method advances to frame 106, where all work-ports, 32, 34, 68 and 70 are opened. Work-ports 32, 34, 68 and 70 are opened, via opening orifices 22, 38, 46, 54, 58, 74, 82, and 88 one at a time, but in no particular order, to the reservoir 12. From frame 106, the method advances to frame 108, where the pressure at each sensor is sensed and stored by the controller 90. Following frame 108, the method proceeds to frame 110, where all sensors are reset to pressure of reservoir 12. Depending on various functional requirements, pressure of reservoir 12 may be set up at some elevated pressure value, but will typically be set at 1 Bar (100 kPa) or lower. Hence, a value at the lower end of the sensing range for the out-of-range sensor is thereby established.

After frame 110, the method advances to frame 112, where all sensors are supplied with fluid at a maximum pressure that pump 14 is capable of providing. After the maximum fluid pressure is provided to the sensors, the method proceeds to frame 114. In frame 114, the maximum pump pressure is sensed at each of the sensors, 18, 24, 40, 48, 60 and 76. Following frame 114, the method advances to frame 116. In frame 116, an average pressure value across all sensors whose sensed pressure is within a prescribed, i.e., acceptable, range of the maximum pump pressure, is determined.

Such an acceptable range for the sensed maximum pump pressure will be established during design and development of hydraulic actuation system 10 based on the system's design parameters and its functional requirements. The acceptable range for the sensed maximum pump pressure will typically be within a small percentage variance of the expected, i.e., known, maximum pump pressure value. Additionally, the determination of the average pressure value may be based on a plurality of sensors whose sensed values are within a certain percentage variance of each other.

Following frame 116, the method proceeds to frame 118, where the determined average pressure value is assigned to the sensor that is operating out of the prescribed range. Hence, a value at the upper end of the sensing range for the out-of-range sensor is thereby established. The determined average pressure value may be assigned to the out-of-range sensor, if the particular sensor remains within the permitted error band relative to the maximum pump pressure. Such a permitted error band is typically established during design and development of hydraulic actuation system 10 based on the system's design parameters, as well as on the functional requirements. Following frame 118, the method advances to frame 120, where the calibration or gain of the sensor that is operating out of the prescribed range is reset based on the reservoir pressure and the average of the maximum pressure values.

As a result of implementation of method 100, in spite of one of the sensors 18, 24, 40, 48, 60 and 76 operating out-of-range, the hydraulic actuation system 10 is controlled to recalibrate the out-of-range sensor to return the machine to expected performance. It may, however, be determined that the out-of-range sensor is not operating within the permitted error band relative to the maximum pump pressure. In such a case, a malfunction signal may be generated by the controller 90 to alert the machine's operator that a recalibration of the out-of-range sensor was unsuccessful, and an actual repair may be required.

While the best modes for carrying out the invention have been described in detail, those familiar with the art to which this invention relates will recognize various alternative designs and embodiments for practicing the invention within the scope of the appended claims.

The invention claimed is:

1. A method for resetting a calibration of a sensor operating out of a prescribed range in a hydraulic actuation system, the hydraulic actuation system including:

a pump arranged to supply fluid flow in response to a fluid flow demand; a reservoir arranged to hold fluid; a plurality of work-ports, such that the pump is in fluid communication with the reservoir and the plurality of work-ports; a plurality of sensors, each sensor arranged to sense pressure at a corresponding one of the plurality of work-ports; a valve system arranged to control fluid flow between the pump, the reservoir and the plurality of work-ports; and a controller arranged to regulate the pump and the valve system in response to the fluid flow demand and to the sensed pressures;

the method comprising:

detecting the sensor operating out of the prescribed range;

relieving pressure in the hydraulic actuation system;

opening all work-ports to the reservoir;

sensing pressure at each sensor;

resetting all the sensors to a reservoir pressure;

supplying all the sensors with the fluid at a maximum pump pressure;

sensing the maximum pump pressure at each of the plurality of sensors;

determining an average pressure value across all sensors of the plurality of sensors whose sensed pressure is within the prescribed range of the maximum pump pressure;

assigning the determined average pressure value to the sensor that is operating out of the prescribed range; and resetting the calibration of the sensor that is operating out of the prescribed range based on the reservoir pressure and the average pressure values.

2. The method according to claim 1, further comprising identifying whether the sensor operating out of the prescribed range is within a permitted error band relative to the maximum pump pressure, wherein said assigning the determined average pressure value to the sensor that is operating out of the prescribed range is accomplished if the sensor operating out of the prescribed range is within the permitted error band relative to the maximum pump pressure.

3. The method according to claim 2, further comprising generating a malfunction signal, if the sensor operating out of the prescribed range is not within the permitted error band relative to the maximum pump pressure.

4. The method according to claim 1, wherein said relieving pressure in the hydraulic actuation system is accomplished manually by an operator of the hydraulic actuation system.

5. The method according to claim 1, wherein said relieving pressure in the hydraulic actuation system is performed for a predetermined amount of time.

6. The method according to claim 1, wherein said opening all work-ports to the reservoir is performed one at a time.

7. The method according to claim 1, wherein said supplying all sensors with fluid at maximum pump pressure is performed one at a time.

8. A method for restoring desired operation of a machine controlled by a hydraulic actuation system having a sensor that is operating out of a prescribed range, the hydraulic actuation system including:

a pump arranged to supply fluid flow in response to a fluid flow demand; a reservoir arranged to hold fluid; a plurality of work-ports, such that the pump is in fluid communication with the reservoir and the plurality of work-ports; a plurality of sensors, each sensor arranged to sense pressure at a corresponding one of the plurality of work-ports; a valve system arranged to control fluid flow between the pump, the reservoir and the plurality of work-ports; and a controller arranged to regulate the pump and the valve system in response to the fluid flow demand and to the sensed pressures to operate the machine;

the method comprising:

detecting the sensor operating out of the prescribed range;
relieving pressure in the hydraulic actuation system;
opening all work-ports to the reservoir;
sensing pressure at each sensor;
resetting all the sensors to a reservoir pressure;
supplying all the sensors with the fluid at a maximum pump pressure;
sensing the maximum pump pressure at each of the plurality of sensors;
determining an average pressure value across all sensors of the plurality of sensors whose sensed pressure is within the prescribed range of the maximum pump pressure;
assigning the determined average pressure value to the sensor that is operating out of the prescribed range; and
resetting the calibration of the sensor that is operating out of the prescribed range based on the reservoir pressure and the average pressure values, such that the desired operation of the machine is restored.

9. The method according to claim 8, additionally comprising identifying whether the sensor operating out of the prescribed range is within a permitted error band relative to the maximum pump pressure, wherein said assigning the determined average pressure value to the sensor that is operating out of the prescribed range is accomplished if the sensor operating out of the prescribed range is within the permitted error band relative to the maximum pump pressure.

10. The method according to claim 9, further comprising generating a malfunction signal, if the sensor operating out of the prescribed range is not within the permitted error band relative to the maximum pump pressure.

11. The method according to claim 8, wherein said relieving pressure in the hydraulic actuation system is accomplished manually by an operator of the hydraulic actuation system.

12. The method according to claim 8, wherein said relieving pressure in the hydraulic actuation system is performed for a predetermined amount of time.

13. The method according to claim 8, wherein said opening all work-ports to the reservoir is performed one at a time.

14. The method according to claim 8, wherein said supplying all sensors with fluid at maximum pump pressure is performed one at a time.

15. A system for resetting a calibration of a sensor operating out of a prescribed range in a hydraulic actuation system, the hydraulic actuation system including:

a pump arranged to supply fluid flow in response to a fluid flow demand; a reservoir arranged to hold fluid; a plurality of work-ports, such that the pump is in fluid communication with the reservoir and the plurality of work-ports; a plurality of sensors, each sensor arranged to sense pressure at a corresponding one of the plurality of work-ports; a valve system arranged to control fluid flow between the pump, the reservoir and the plurality of work-ports; and a controller arranged to regulate the pump and the valve system in response to the fluid flow demand and to the sensed pressures;

the controller adapted for:

detecting the sensor operating out of the prescribed range;
relieving pressure in the hydraulic actuation system;
opening all work-ports to the reservoir;
sensing pressure at each sensor;
resetting all the sensors to reservoir pressure;
supplying all the sensors with fluid at maximum pump pressure;
sensing the maximum pump pressure at each of the plurality of sensors;
determining an average pressure value across all sensors of the plurality of sensors whose sensed pressure is within the prescribed range of the maximum pump pressure;
identifying whether the sensor operating out of the prescribed range is within a permitted error band relative to the maximum pump pressure;
assigning the determined average pressure value to the sensor that is operating out of the prescribed range, if the sensor operating out of the prescribed range is within the permitted error band relative to the maximum pump pressure; and
resetting the calibration of the sensor that is operating out of the prescribed range based on the reservoir pressure and the average pressure values.

16. The system according to claim 15, wherein said relieving pressure in the hydraulic actuation system is accomplished manually by an operator of the hydraulic actuation system.

17. The method according to claim 15, wherein said relieving pressure in the hydraulic actuation system is performed for a predetermined amount of time.

18. The method according to claim 15, wherein said opening all work-ports to the reservoir is performed one at a time.

19. The method according to claim 15, wherein said supplying all sensors with fluid at maximum pump pressure is performed one at a time.

20. The method according to claim 15, further comprising generating a malfunction signal, if the sensor operating out of the prescribed range is not within the permitted error band relative to the maximum pump pressure.

* * * * *